(12) United States Patent
Nieuwenhuis et al.

(10) Patent No.: US 10,859,859 B2
(45) Date of Patent: Dec. 8, 2020

(54) METHOD, COMPUTING DEVICE, AND COMPUTER PROGRAM FOR PROVIDING A MOUNTING EDGE MODEL

(71) Applicants: Carl Zeiss AG, Oberkochen (DE); Carl Zeiss Vision International GmbH, Aalen (DE)

(72) Inventors: Claudia Nieuwenhuis, Aalen (DE); Oliver Schwarz, Ellwangen (DE)

(73) Assignees: Carl Zeis AG, Oberkochen (DE); Carl Zeiss Vision International GmbH, Aalen (DE)

( * ) Notice: Subject to any disclaimer, the term of this patent is extended or adjusted under 35 U.S.C. 154(b) by 20 days.

(21) Appl. No.: 16/522,939

(22) Filed: Jul. 26, 2019

(65) Prior Publication Data

US 2020/0018994 A1 Jan. 16, 2020

Related U.S. Application Data

(63) Continuation of application No. PCT/EP2018/051954, filed on Jan. 26, 2018.

(30) Foreign Application Priority Data

Jan. 27, 2017 (EP) .................... 17153538

(51) Int. Cl.
*G02C 13/00* (2006.01)
*G06T 7/73* (2017.01)
*G06N 20/00* (2019.01)
*G06F 30/00* (2020.01)

(52) U.S. Cl.
CPC .......... *G02C 13/003* (2013.01); *G06F 30/00* (2020.01); *G06N 20/00* (2019.01); *G06T 7/75* (2017.01);
(Continued)

(58) Field of Classification Search
CPC ...... G02C 13/003; G02C 7/027; G02C 7/061; G02C 7/028; G02C 7/02; G02C 7/024;
(Continued)

(56) References Cited

U.S. PATENT DOCUMENTS 4,852,184 A * 7/1989 Tamura .................. G06T 19/00
382/282
6,659,609 B2 12/2003 Mothes
(Continued)

FOREIGN PATENT DOCUMENTS

DE 102011115239 A1 3/2013
WO 0184222 A1 11/2001

OTHER PUBLICATIONS

"Eyeglasses Lens Contour Extraction from Facial Images Using an Efficient Shape Description"; Diana Borza, Sensors, vol. 13, No. 10, 2013, pp. 13638-13658(21) (Year: 2013).*
(Continued)

*Primary Examiner* — Michael S Osinski
(74) *Attorney, Agent, or Firm* — Thrive IP®; Georg M. Hasselmann

(57) ABSTRACT

A method for providing a mounting edge model, a corresponding computer program, and a corresponding computing device are disclosed. To provide the mounting edge model, first a plurality of data sets is provided, each of which describes a course of a mounting edge. Such data sets can be obtained from tracer data, for example. On the basis of the data sets, a parametric mounting edge model is then derived.

11 Claims, 3 Drawing Sheets

(52) U.S. Cl.
CPC ............... *G06T 2207/20076* (2013.01); *G06T 2207/20081* (2013.01); *G06T 2207/30201* (2013.01)

(58) Field of Classification Search
CPC ........ G02C 7/025; G02C 7/065; G02C 7/068; G02C 13/005; G06T 7/75; G06T 7/149; G06T 7/70; G06T 7/73; G06T 2207/20076; G06T 2207/20081; G06T 2207/30201; G06T 2207/2207; G06T 2207/10012; G06T 19/00; G06T 19/006; G06T 19/20; G06T 15/04; G06N 20/00; G06F 30/00; G06F 17/50; A61B 3/0041; A61B 3/1015; A61B 3/107; G02B 2027/0178; G06K 9/00281; G06K 9/00208; G06K 9/00248; G06K 9/00255; G06K 9/00268; G06K 9/00275
See application file for complete search history.

(56) References Cited

U.S. PATENT DOCUMENTS

| | | | | |
|---|---|---|---|---|
| 9,569,890 | B2* | 2/2017 | Choukroun | G02B 27/0172 |
| 10,146,997 | B2* | 12/2018 | Kaehler | G02B 27/017 |
| 10,222,635 | B2* | 3/2019 | Fonte | G06Q 30/0621 |
| 10,564,446 | B2* | 2/2020 | Nieuwenhuis | G02C 13/003 |
| 10,775,647 | B2* | 9/2020 | Joy | G06T 19/00 |
| 2009/0219486 | A1* | 9/2009 | Bonnin | A61B 3/0041 351/237 |
| 2011/0273669 | A1* | 11/2011 | Abitbol | A61B 3/1005 351/212 |
| 2012/0105801 | A1* | 5/2012 | Yamakaji | G02C 7/025 351/159.76 |
| 2013/0247619 | A1* | 9/2013 | Tanaka | B29D 11/00028 65/102 |
| 2015/0055085 | A1 | 2/2015 | Fonte et al. | |
| 2015/0346515 | A1* | 12/2015 | Kozu | G02C 7/065 351/159.42 |
| 2015/0352681 | A1* | 12/2015 | Suzue | G02C 7/027 705/26.5 |
| 2016/0161765 | A1* | 6/2016 | Kozu | G02C 13/003 351/159.75 |
| 2016/0246078 | A1* | 8/2016 | Choukroun | G06T 5/00 |
| 2016/0299360 | A1 | 10/2016 | Fonte et al. | |
| 2017/0018088 | A1* | 1/2017 | Jeong | G06T 15/205 |
| 2017/0027437 | A1* | 2/2017 | Neal | A61B 3/107 |
| 2017/0169501 | A1* | 6/2017 | Xia | G06K 9/00248 |
| 2018/0017815 | A1* | 1/2018 | Chumbley | G02C 5/12 |
| 2019/0033624 | A1* | 1/2019 | Breuninger | G02C 13/005 |
| 2019/0324291 | A1* | 10/2019 | Hatanaka | G02C 7/027 |
| 2020/0211218 | A1* | 7/2020 | Le Gallou | G06T 7/73 |

OTHER PUBLICATIONS

H. Yanagisawa et al. "Development of Interactive Industrial Design Support System Considering Customer's Evaluation," JSME International Journal, Series C, vol. 47, No. 2, 2004.

Wu et al. "Automatic Eyeglasses Removal from Face Images," IEEE Transactions on Pattern Analysis and Machine Intelligence, vol. 26, No. 3, pp. 322 to 336, Mar. 2004.

C. Bishop "Pattern Recognition and Machine Learning," Springer Verlag, ISBN-10: 0-387-31073-8, pp. 1 to 738, 2006.

S.-Z. Huang et al. "Human-centric design personalization of 3D glasses frame in markerless augmented reality," Advanced Engineering Informatics 26, pp. 35-45, 2012.

D. Borza et al., "Eyeglasses Lens Contour Extraction from Facial Images Using an Efficient Shape Description," Sensors, vol. 13, pp. 13638 to 13658, 2013.

Internet citation—Wikipedia "Gaussian filter," retrieved from https://en.wikipedia.org/wiki/Gaussian_filter, last accessed Oct. 7, 2019.

Internet citation—Wikipedia "Histogram," retrieved from https://en.wikipedia.org/wiki/Histogram, last accessed Oct. 7, 2019.

Internet citation—Wikipedia "Independent component analysis," retrieved from https://en.wikipedia.org/wiki/Independent_component_analysis, last accessed Oct. 7, 2019.

Internet citation—Wikipedia "Least Squares," retrieved from https://en.wikipedia.org/wiki/Least_squares, last accessed Oct. 7, 2019.

Internet citation—Wikipedia "Machine learning," retrieved from https://en.wikipedia.org/wiki/Machine_learning, last accessed Oct. 7, 2019.

Internet citation—Wikipedia "Nonparametric statistics," retrieved from https://en.wikipedia.org/wiki/Nonparametric_statistics, last accessed Oct. 7, 2019.

Internet citation—Wikipedia "Principal component analysis," retrieved from https://en.wikipedia.org/wiki/Principal_component_analysis, last accessed Oct. 7, 2019.

Internet citation—Wikipedia "Spline (mathematics)," retrieved from https://en.wikipedia.org/wiki/Spline_(mathematics), ast accessed Oct. 7, 2019.

Internet citation—Wikipedia "Template matching," retrieved from https://en.wikipedia.org/wiki/Template_matching, last accessed Oct. 7, 2019.

European Search Report issued in EP17153535.8, to which this application claims priority, dated Jul. 10, 2017.

International Search Report issued in PCT/EP2018/051954, to which this application claims priority, dated May 11, 2018, and English-language translation thereof.

International Preliminary Examination Report issued in PCT/EP2018/051954, to which this application claims priority, dated May 22, 2019, and English-language translation thereof.

Office action by the European Patent Office issued in European patent application EP 18 701 185.3, which is a counterpart hereof, dated Sep. 24, 2020.

Hartley et al.: "Multiple View Geometry in Computer Vision," 2nd edition, pp. 1 to 8, Cambridge University Press 2004.

Internet citation "Parametrisches Modellieren [Parametric Modelling],"—CAD (Computer Aided Design) technology, available at the url www.blien.de/ralf/cad/db/para_mod.htm (as at Jan. 27, 2017) and English-language machine translation thereof.

Office action by the European Patent Office issued in European patent application EP 17 153 538.8, which is a counterpart hereof, dated Sep. 30, 2020.

* cited by examiner

METHOD, COMPUTING DEVICE, AND COMPUTER PROGRAM FOR PROVIDING A MOUNTING EDGE MODEL

CROSS REFERENCE TO RELATED APPLICATIONS

This application is a continuation application of international application PCT/EP2018/051954, filed Jan. 26, 2018, which claims priority to European patent application EP 17153538.8, filed Jan. 27, 2017, both of which are hereby incorporated by reference in their entireties.

TECHNICAL FIELD

The present application relates to methods and apparatuses for providing a frame rim model of a spectacle frame and corresponding computer programs and computing devices. A frame rim of a spectacle frame is that part of the spectacle frame into which a spectacle lens is fitted, wherein a first section of the frame rim is provided for a left spectacle lens and a second section of the frame rim is provided for the right spectacle lens. In the context of this application, a frame rim is understood to mean not only the frame rim of a spectacle frame extending completely around the spectacle lens, but also the corresponding variables in the case of frameless spectacles or spectacles having a partial frame, e.g., spectacle frame inner rim, support lens outer edge or spectacle lens outer edge. A frame rim model should be understood to mean a mathematical and/or geometric description of the frame rim of a spectacle frame or of at least the first or second section of the frame rim.

BACKGROUND

In order to fit the spectacle lenses correctly into a spectacle frame, it is necessary on the one hand to determine so-called centering parameters, so that the optical centers of the lenses can be brought into alignment with the visual axes of the corresponding eyes to acquire information concerning the pupil distance and information concerning the height of the pupils in relation to the spectacle frame, for example. On the other hand, it is necessary to know the bearing edge of the spectacle lens defined by the spectacle frame, in which spectacle frame the spectacle lens is to be received.

Apart from information concerning the pupil distance and information concerning the height of the pupils in relation to the spectacle frame, the following variables in particular are included under the term centering parameter: monocular pupil distance PD, corneal vertex distance HS according to reference point requirement and/or according to ocular pivot point requirement, monocular centration distance, centering point coordinates, lens distance, decentration of the centering point, lens height and width, lens center distance, spectacle lenses forward inclination angle $\alpha$, frame lens angle $\beta$, and fitting height.

The centering parameters are usually determined by an ophthalmic optician. Important centering parameters are defined for example in standard EN ISO 13666:2012 (D/E) and can be established by an optician and a subject standing or sitting opposite one another, wherein the subject puts on the frame of his/her choice with a spectacle lens fitted therein. The subject is asked to look into the distance, and the optician then draws on the lens or a ruled contact film, based on his/her visual judgement, a cross at the viewing reference point, which he has sighted from his visual reference opposite the subject. This cross (centering cross) then determines the position of the optical center-point of the spectacle lens to be used in the frame. This method is performed separately for each of the subject's eyes. The distance between the centering crosses thus established is the pupil distance PD.

For the centering parameter determination, however, automated measurement systems are nowadays also used. Such a measurement system is described for example in WO 01/84222 A1. This system contains a digital video camera accommodated in a height-adjustable manner on a column, the lens of which is arranged together with a mirror and a light source in the region of the front face of the housing. The system makes it possible, in particular, to measure distances and to capture dimensions which have to be taken into account for fitting spectacle lenses by grinding. In this system, there is a computer connected to the digital video camera, which computer determines centering parameters for the spectacle frame by means of image evaluation from the image of a spectacle wearer with a spectacle frame and with a measuring bracket fixed to the spectacle frame.

In some of these measurement systems one or more images of a head of a person wearing the restrictive spectacle frame are recorded simultaneously or sequentially, and the centering parameters are ascertained from the recorded images by image analysis. Algorithms used in the process are based, inter alia, on recognizing the frame rims of the spectacle frame in the recorded images.

Apparatuses and methods of this type are also described in DE 10 2011 115 239 B4. In the case of the procedure described therein, a tracer data set is present for a spectacle frame currently to be measured on a person's head. In this case, in accordance with DIN EN ISO 13666 mentioned above, a tracer is an apparatus for the accurate, often three-dimensional, measurement of the lens shape of a spectacle frame for edging the lens to shape, that is to say an apparatus that measures the frame rim of a spectacle frame. In this case, in order to determine the tracer data set, the tracer can measure either the frame rim of the spectacle frame or the lens edge of a support lens shaped to be inserted into the frame rim. In both cases, the tracer data set then describes only the frame rim of the spectacle frame, but not other parts of the spectacle frame. Tracer data sets, once they have been generated by the tracer, usually contain information designating the source of the data set (i.e., the tracer used). However, this information may also be removed in the course of the processing of the tracer data set. The procedure in DE 10 2011 115 239 B4 is then based on finding a contour described by the tracer data set in image recordings. This involves using conventional methods of image analysis such as pattern searching or so-called template matching, the latter being described for example in the article "Template Matching" on Wikipedia on Jan. 17, 2017. Pattern searching, also referred to as pattern-based searching or pattern matching, is a designation for symbol-processing methods which identify corresponding structures in the recorded images on the basis of a predefined pattern—predefined by the tracer data set in this case.

The use of the tracer data set facilitates the recognition of the frame rim in the images in accordance with the explanations in DE 10 2011 115 239 B4 compared with other procedures. One disadvantage of this procedure, however, is that the tracer data set, and hence the spectacles put on, must be known in order to find the frame rim in the recorded images. Typically, however, an optician will generate tracer data from a frame only when a customer has already selected the spectacles for purchase. Moreover, since generating the tracer data is time-consuming, they are usually generated only when the customer has already left the optician's store because otherwise a long waiting time would arise for the customer. On the other hand, the centering parameters are determined in the routine workflow on the part of an optician directly after the selection of the spectacle frame, with the result that the customer can already collect the finished spectacles upon the next visit.

Consequently, implementing the method in DE 10 2011 115 239 B4 thus necessitates changing the optician's routine workflow, which moreover means waiting times for the customer when visiting the optician. Moreover, this procedure is also laborious since, for this purpose, every optician must have available the respective tracer data set for every frame or must create it before the centering parameters are determined. Finally, the tracer data sets are at least preferably required as three-dimensional data sets (i.e., i.e., data sets which describe the three-dimensional course of the frame rim), while some conventional tracers generate only two-dimensional data sets which describe the course of the frame rim in a plane.

Szu-Hao Huang et al., "Human-centric design personalization of 3D glasses frame in markerless augmented reality", Advanced Engineering Informatics 26 (2012) pages 35-45 describe a method for the virtual fitting of a spectacle frame. A parametric model of a spectacle frame is used in this case, the model being created by means of a principal component analysis of a multiplicity of stored spectacle frame models. In this case, the spectacle frame models are present as polygon meshes corresponding to CAD (Computer Aided Design) data sets of spectacle frames.

US 2015/055085 A1 discloses virtually trying on spectacles, a model of the spectacles being used for this purpose. Recorded images of the head are analyzed by a principal component analysis.

Wu Chenyu et al., "Automatic Eyeglasses Removal from Face Images", IEEE Trans. on pattern intelligence and machine intelligence, vol. 26 No. 3 pages 322-336 discloses a method for removing spectacles from a recorded image of a head. This involves using various learning methods and a parametric model for a spectacle frame. The parameters of the parametric model used therein, which describe the shape of the frame, are assumed to have a normal distribution.

Diana Borza et al., "Eyeglasses Lens Contour Extraction from Facial Images Using an Efficient Shape Description", Sensors 2013, 13, pages 13638-13658 discloses a method for exactly determining a position of spectacles and also the size and shape of a spectacle frame from an image recording. A 2D model of a spectacle frame on the basis of Fourier descriptors is used in this case.

SUMMARY

Against this background, it is generally an object of the present application to provide methods, computing devices and computer programs for providing a frame rim model, wherein the frame rim model is intended to cover a multiplicity of spectacle frames, such that for the above-explained image analysis for the purpose of determining centering parameters, for example, a separate tracer data set does not have to be created for every spectacle frame.

The above-cited publication by Szu-Hao Huang et al. includes models of spectacle frames, and these are used to obtain a model of an entire spectacle frame by means of a principal component analysis. A model of this type is suitable only to a limited extent for the frame rim recognition explained in the introduction, since the model contains data regarding the spectacle earpieces, for example, which have nothing to do with recognizing the frame rim, but nevertheless have to be processed as well.

It is therefore a first object of the invention to provide a method for providing a frame rim model which is better suited to the abovementioned identification of a frame rim as described in DE 10 2011 115 239 B4 by comparison with the model yielded by the method of Szu-Hao Huang et al.

For this purpose, in accordance with a first aspect of the invention, a computer-implemented method is provided. further exemplary embodiments of the method of the first aspect are discussed below.

A Gaussian distribution of parameters is taken as a basis in the above-cited publication by Wu Chenyu et al. However, shapes of real frame rims do not necessarily vary in accordance with a Gaussian distribution. If a Gaussian distribution is taken as a basis when identifying the frame rim in accordance with DE 10 2011 115 239 B4, this has the effect that the method arrives at a qualitatively inadequate solution, since many shapes of frame rims are not contained in the model at all and thus cannot be detected either.

It is therefore a second object of the invention to provide a method for providing a frame rim model which is better suited to identifying a frame rim than a model having a fixed Gaussian distribution of parameters.

For this purpose, in accordance with a second aspect of the invention, a computer-implemented method is provided. Further exemplary embodiments of the method of the second aspect are discussed below.

The method for providing a model of a spectacle frame in accordance with Szu-Hao Huang et al., which uses a principal component analysis, inter alia, is mathematically relatively complex. Proceeding from this, a third object of the present invention is to propose a simplified method for providing a frame rim model.

For this purpose, in accordance with a third aspect of the invention, a computer-implemented method is provided. Further exemplary embodiments of the method of the third aspect are discussed below.

The method in accordance with Szu-Hao Huang et al. assumes that 3D data of spectacle frames are present in a form suitable for the principal component analysis. If data describing the frame rim of a spectacle frame originate from different sources, for example where ascertained using different measuring instruments, e.g., using different tracers on the part of different frame manufacturers or opticians, the data are present in different formats and may moreover be noisy as a result of the measurement process, i.e., have fluctuations caused by the measurement.

Proceeding from this, a fourth object of the present invention is to provide a method for providing a frame rim model in which data from different sources and/or noisy data are able to be processed better.

For this purpose, in accordance with a fourth aspect of the invention, a computer-implemented method is provided. Further exemplary embodiments of the fourth aspect are discussed below.

Further methods for image analysis which use a frame rim model which has been created in accordance with one of the above aspects are discussed. Moreover, provision is made of a computer program carrying out one of the methods defined above, and a corresponding computing device.

The frame rim models provided by the above methods can find application in particular for centering spectacle lenses, for fitting spectacle lenses by grinding, and for producing spectacle lenses. Methods provided for this purpose are discussed below.

According to the invention, a method for providing a frame rim model is provided, comprising:

providing a multiplicity of data sets, each describing a course of a frame rim of a respective spectacle frame, and providing a parametric frame rim model on the basis of the multiplicity of data sets.

In this case, a course of a frame rim should be understood to mean the course of the frame rim for one spectacle lens or for both spectacle lenses (left and right spectacle lenses), i.e., for one or both of the sections mentioned above. A parametric frame rim model is a frame rim model having one or more variable parameters. A change in the parameter or parameters then results in a change in the geometry of the frame rim described by the frame rim model, for example with regard to the size or shape or with regard to the orientation of first and second sections for the two spectacle lenses with respect to one another. This is similar to parametric modeling in CAD (Computer Aided Design) technology (cf. the url www.blien.de/ralf/cad/db/para_mod.htm as of 27 Jan. 2017), wherein in the present application the parameters are not restricted to dimensions and changes in the geometry e.g., with regard to size and/or shape as a result of changes in the parameters are generally possible. Parameters of a model of this type are thus variables by way of which the frame rim described by the frame rim model is variable. A parametric frame rim model in the sense used here can also be a so-called nonparametric model; nonparametric models are described for example in the Wikipedia article "Nonparametric Statistics". This involves models whose model structure is not defined a priori, but rather is determined only on the basis of the multiplicity of data sets. They likewise have parameters, but the type and number of the parameters are likewise not defined a priori. They are also applicable if the necessary prerequisites for specific parametric models (e.g., for Gaussian distributions) are not met in the data.

By virtue of the parametric frame rim model being provided on the basis of the multiplicity of data sets, a multiplicity of data sets influence the model. This has the effect that the parametric frame rim model is applicable to a multiplicity of different spectacle frames, including spectacle frames which are not directly described by a data set of the multiplicity of data sets. By means of the parameter or the parameters of the parametric frame rim model, the parametric frame rim model can then be fitted to the frame rim of a specific spectacle frame.

In accordance with the first aspect of the invention, optionally also in other aspects of the invention, use is made here of tracer data sets of different spectacle data of spectacle frames which were determined using a corresponding multiplicity of spectacle frames. The use of tracer data sets means that data are present only for the frame rims required, and not additionally also for other parts of a spectacle frame such as earpieces. In contrast to the models used in the publication by Szu-Hao Huang et al., tracer data sets contain only sequences of points in space or in the plane which describe the frame contour. They are not polygon meshes as in the publication by Szu-Hao Huang cited above, which also contain edges and areas in addition to points. This can simplify the creation of the frame rim model and a subsequent image analysis since the frame contour need not first be calculated from a model of an entire spectacle frame. Moreover, polygon meshes of spectacle frames as in the method of Szu-Hao Huang et al., for example in the form of CAD data sets, with respect to the spectacle frames, are often not available to an optician since they are a trade secret of the frame manufacturers. By contrast, however, most opticians have a tracer, which can easily be used to obtain a multiplicity of tracer data sets. Consequently, the method in accordance with the first aspect of the invention can also easily be carried out by an optician, without the latter having to rely on the provision of data sets by third parties such as frame manufacturers, for example.

In other embodiments of the second, third and fourth aspects, as an alternative thereto, it is also possible to use CAD data (Computer Aided Design) of the spectacle frames from spectacle frame manufacturers, which were used by the spectacle frame manufacturers for the manufacture or design of the spectacle frames. Preferably, the data sets are present here as 3D data sets, that is to say that they describe the spatial course of the respective frame rim. More accurate models arise in this way, since all three spatial directions can be determined. However, it is also possible to use 2D data sets, which describe the course of the frame rims only in a plane.

What can be achieved, in particular, by using the multiplicity of data sets is that the parametric frame rim model does not permit any "atypical" frame rim courses, e.g., frame rims corresponding to truncated spectacle lenses, nonsymmetrical spectacle lenses, or spectacle lenses having lens edges having a bulge or indentation, that is to say a high curvature.

The data sets are preferably present as 3D data sets, i.e., data sets which three-dimensionally describe the course of the respective frame rim. In particular, the data sets can be present as point clouds having a multiplicity of measurement points lying on the frame rim. If only 2D data sets are present (i.e., descriptions of the frame rim in a plane), for example because a tracer supplies only 2D data sets, it is possible, by approximation of spectacle lenses framed by the frame rim, as planes or paraboloids or similar 3D models, to generate a three-dimensional data set therefrom. For this purpose, by way of example, in one exemplary embodiment, typical values for centering parameters such as the forward inclination angle (in accordance with 5.18 of DIN EN ISO 13666:2012) and the frame lens angle (in accordance with 17.3 of DIN EN ISO 13666:2012) can be determined. This determination can be effected from order statistics for spectacle lenses by ascertaining mean values, medians or similar features of distributions for forward inclination angle and frame lens angle over a multiplicity of spectacle lenses. Alternatively, it is also possible simply to assume typical values for these parameters. In addition, it is possible to assume a symmetry of two planes, paraboloids or similar 3D models in which the spectacle lenses lie, with respect to one another. With forward inclination angle, frame lens angle and the assumption of symmetry, the position of the two planes then results (e.g., defined by normal vectors on the planes and reference points for the normal vectors), into which the 2D data sets are then projected.

Even if 3D data sets and accordingly 3D frame rim models are preferred, the method according to the invention also makes it possible to provide a 2D model on the basis of 2D data sets. This can likewise be advantageous in some applications. In this regard, 2D data sets are smaller (fewer data) than corresponding 3D data sets, and 2D models have fewer parameters in most cases owing to the lower dimensionality, such that optimization methods using the 2D model, e.g., if the model is fitted to a frame rim in an image, as described later, have a lower complexity. In some applications, e.g., when identifying a frame rim in an individual image, only a 2D model is actually required.

In one variant, providing the parametric frame rim model can comprise calculating the parametric frame rim model from the multiplicity of data sets. Here the multiplicity of data sets is thus used as a basis for a new creation of a parametric frame rim model. One example thereof is machine learning on the basis of the multiplicity of data sets. An overview of machine learning is explained in the German Wikipedia article "Maschinelles Lernen" ["Machine learning"] retrieved on Jan. 17, 2017 and is a generic term for the artificial generation of knowledge from experience. In the present example, the multiplicity of data sets represents the experience, and the parametric frame rim model represents the generated knowledge. The Wikipedia article cited also gives an overview of various approaches and algorithms which can be used here.

One possible procedure for calculating the parametric frame rim model from the multiplicity of data sets is to apply a principal component analysis. Principal component analysis (PCA) is a method of multivariate statistics in which a multiplicity of so-called "principal components" are created, wherein the data sets can then be represented as a sum of a mean value and a linear combinations of the principal components. This involves, for example, firstly determining the mean value from the multiplicity of data sets and subtracting it from the data sets. The principal components are then determined from the result. In this case, the principal components are orthogonal to one another. This means that the representation of each data set is unique, that is to say that the respective linear combination has unique coefficients. These coefficients of such a linear combination of the principal components then represent the parameters of the parametric frame rim model. One advantage of principal component analysis is, moreover, that it can minimize the dimension of the model space such that as little information as possible is lost. The dimension of the model space is equal to the number of parameters of the model and, in the case of principal component analysis, the number of principal components (one coefficient for each principal component). Principal component analysis is described in greater detail for example in the German Wikipedia article "Hauptkomponentenanalyse" ["Principal component analysis"] retrieved on Jan. 17, 2017.

Principal component analysis can additionally be used—in a manner similar to filtering as described further below—to remove noise or other artefacts. The principal components which result from the above principal component analysis describe typical curve courses of frame rims whose linear combinations can serve as approximations of the original frame rims defined by the multiplicity of data sets. The coefficients of the principal components for a specific frame rim are ascertained by a curve that is defined by the respective frame rim being projected onto the principal components. By omitting principal components having low importance (small coefficient, corresponds to a small variance of the respective data set of the respective frame rim along this principal component), it is possible to eliminate the noise components. Therefore, the representation of the frame rims by means of principal component analysis, by omitting such principal components, can also fulfill a filter function.

As an alternative, an independent component analysis (ICA) can be used, which is described for example in the German Wikipedia article "Unabhängigkeitsanalyse" ["Independent component analysis"] retrieved on Jan. 20, 2017. This type of analysis likewise yields components which, summed as a linear combination with respect to a mean value, can represent the data sets. The components are not orthogonal here, however, and so there are at least in part a plurality of possibilities (i.e., a plurality of sets of coefficients) for representing a data set. Here, too, the coefficients of the linear combination represent the parameters of the parametric frame rim model.

In the second aspect of the invention, optionally also in the first or fourth aspect of the invention, providing the parametric frame rim model comprises calculating probability distributions for parameters of a predefined parametric frame rim model on the basis of the multiplicity of data sets. In this variant, therefore, a parametric frame rim model is not totally newly created, rather firstly a parametric frame rim model is predefined. One simple example of such a model is two planes that are symmetrical with respect to a center plane, wherein each plane approximately describes the position of a spectacle lens. Instead of the planes, higher-order shapes are also possible, for example quadratic or cubic splines with associated parameters. In this case, splines are functions which are composed piecewise of quadratic functions, cubic functions or functions of even higher order in such a way that the transitions are continuous or continuously differentiable. Splines are described for example in the German Wikipedia article "Spline" ["Spline"] retrieved on Jan. 17, 2017. In addition, the frame rims, too, can then be described further by means of parametric geometric shapes within the planes. One simple example thereof is ellipses, which can be characterized for example by the length of the semi-major axes, usually designated by a, and the semi-minor axes, usually designated by b, as parameters. In this case, the major axis formed from the semi-major axes is that axis which extends through the focus points of the ellipse, and the minor axis formed from two semi-minor axes is perpendicular thereto.

Probability distributions can then be created for these parameters. For this purpose, the predefined parametric frame rim model can be fitted for example to each of the data sets in order to obtain respective parameter values for the data set. Such fitting can be carried out for example using the method of least squares (see the German Wikipedia article "Methode der kleinsten Quadrate" ["Method of least squares"] retrieved on Jan. 17, 2017) or else using other conventional fit methods. In this way, parameter values for the multiplicity of data sets are obtained, which can then be evaluated statistically. By way of example, it is possible to indicate mean value and standard deviation for each of the parameter values. By virtue of this procedure, arbitrary distributions of the parameter values can be detected and analyzed, and there is no limitation to a predefined distribution such as a Gaussian distribution. In this case, the statistical evaluation can be carried out in a simple manner by means of a histogram, as described for example in the German Wikipedia article "Histogramm" ["Histogram"], version on Dec. 11, 2017.

These probability distributions can then be used during a later use of the model for the faster fitting of the parametric frame rim model to a specific frame rim (for example a frame rim identified in an image), by the use of fitting methods which concomitantly take account of the statistical distribution. Such optimization methods which concomitantly take account of the probability distributions over the parameters to be optimized include, for example, Markov Chain Monte Carlo methods (MCMC methods). Such optimization methods are described for example in Christopher Bishop, "Pattern Recognition and Machine Learning", Springer Verlag 2006, ISBN-10: 0-387-31073-8. These methods estimate optimum parameters of a model by choosing the individual parameters randomly in accordance with their probability distribution and then assessing how well the specific model resulting therefrom (i.e., the model with the parameters chosen in this way) matches the data. This is repeated very often, e.g., more than 10 000 times or more, wherein the number of repetitions is also dependent on the method respectively chosen and the implementation thereof. The result obtained is a probability distribution over model parameter sets (that is to say over all of the parameters together), from which it is possible to select e.g., the parameter set having the highest probability as "best fit", i.e., as fitted model, or alternatively e.g., the mean value or median of the distribution: In particular, probability distributions of parameters of the non-parametric models mentioned above can also be determined in this way.

In the third aspect of the invention, optionally also in the first or fourth aspect of the invention, providing the parametric frame rim model comprises providing the multiplicity of data sets or a multiplicity of further data sets derived from the multiplicity of data sets as the model, wherein a parameter of the parametric frame rim model then indicates a data set of the multiplicity of data sets or of the multiplicity of further data sets. Here, therefore, the data sets or further data sets derived therefrom are used directly as model, and a parameter indicates a respective data set, for example a number of the data set. In this way, complex processing of the data sets for example by means of principal component analysis is not necessary for creating the model. In the case of such a parametric frame rim model, for fitting for example to a frame rim found in an image, it is then possible to select that data set which comes closest to the frame rim in the image (for example once again by means of the method of least squares). Derived further data sets in this case are data sets which are obtained from the multiplicity of data sets by application of mathematical operations such as the transformations explained below.

In the fourth aspect of the invention, optionally also in the other aspects of the invention, providing the parametric frame rim model comprises transforming the multiplicity of data sets. A multiplicity of transformed data sets are obtained in this way. In this case, a transformation of a data set should be understood to mean the application of an operation to the data set which converts the data set into a different form, i.e., a respective further data set, wherein the information of the data set regarding the geometry of the frame rim is maintained at least approximately. Transformations of this type can be used in particular for normalization or reparameterization in order to bring the multiplicity of data sets as it were into a mutually corresponding format. A reparameterization here is a change of the parameters and/or values (e.g., coordinates) which describe the frame rim, such as a change of a coordinate system used or a change of a basis such as e.g., a reference point of a coordinate system used. Specific examples are explained further below.

For this purpose, in a first variant of the fourth aspect of the invention, optionally also in other aspects of the invention, the transformation can comprise a coordinate transformation. In a coordinate transformation, data present in a first coordinate system are converted into a second coordinate system. As a result of such coordinate transformations, data sets present in different first coordinate systems here can be transformed into a common second coordinate system, and/or the data sets can be converted into a coordinate system that is better suited to later processing. In this regard, data sets present in cartesian coordinates ((x, y) in 2D or (x, y, z) in 3D) can be converted into polar coordinates ($\varphi$, r) (in 2D) or spherical coordinates ($\varphi$, $\psi$, r) (in 3D). In addition, by means of a coordinate transformation, the coordinate systems of the data sets can be brought to mutually corresponding reference points. By way of example, the midpoint of a section of the frame rim for one spectacle lens can serve as a reference point, wherein the geometric centroid, in particular, can be used as the midpoint. In other embodiments, a midpoint between the frame rim parts for the two spectacle lenses can also serve as a reference point. In addition, by means of the coordinate transformation, a rotation can be effected in order to orient the data sets in an identical direction. In this regard, by way of example, a horizontal direction linking the midpoints according to a boxing system (5.4 DIN EN ISO 13666 from October 2013) of right and left spectacle lenses in the respective spectacle frame can be defined as the x-axis, and directions perpendicular thereto as the y-axis and z-axis. By way of example, it is possible to define a mean value of the two normal of the planes approximating the spectacle lenses as the z-axis (in the case of data sets describing both sections of the frame rim for one of the spectacle lenses, e.g., the left spectacle lens) and a direction perpendicular thereto as the y-axis, wherein the spectacle lenses are defined by the data sets. By means of rotations, all the data sets of the multiplicity of data sets are then oriented into this coordinate system.

In addition, in a second variant of the fourth aspect of the invention, optionally also in other aspects of the invention, the transformation can also comprise resampling of the frame rims defined by the data sets, wherein the geometries defined by the data sets for example in polar coordinates are sampled by means of constant angular steps around a common reference point. In this case, the reference point can be chosen as explained above. In this way, the data sets are made more uniform with regard to their representation, which simplifies the subsequent further processing, for example the application of machine learning methods as explained above. Such resampling is one example of a reparameterization.

In a third variant of the fourth aspect of the invention, optionally also in other aspects of the invention, the transforming comprises a filtering of the data sets using a low-pass filter in order to bring about a smoothing of the frame rim geometries defined by the data sets. In this case, a filtering should be understood to mean a transformation of data sets in the sense mentioned above, by means of which noise or other measurement artefacts which occurred during the creation of the data sets are reduced or eliminated, that is to say that a partial aspect of the signal is partly or completely suppressed. Examples of such a filtering include a Gaussian filtering (cf. the German Wikipedia article "Gauß-Filter" ["Gaussian filter"], version on Jan. 18, 2017) or a Fourier filtering. In the case of a Fourier filtering, a Fourier transformation from the space domain to the frequency domain is carried out on the data sets, and high-frequency components of the resulting frequency spectrum are then damped, i.e., reduced, for the low-pass filtering. For this Fourier filtering, two dimensions of the data of points of the data sets (for example x- and y-coordinates of points of the data sets) can be represented as complex numbers by means of the x-coordinate indicating the real part and the y-coordinate indicating the imaginary part). In the case of three-dimensional data sets, the third dimension (the z-coordinate in this case) can be filtered separately. In this case, it is possible to utilize the periodicity of the Fourier basis for the Fourier transformation. A Gaussian filtering in the frequency domain is also possible, wherein here the three dimensions can be filtered independently of one another and the periodicity can be utilized by means of a periodic continuation taking place at the beginning and at the end.

An inverse transformation (inverse Fourier transformation) can then be carried out. In other exemplary embodiments, it is also possible to carry out further processing, for example the abovementioned calculation of the model, in the frequency domain and only afterward, for example, to carry out an inverse transformation.

The filtering can facilitate a subsequent process of providing the parametric frame rim model since such measurement artefacts or noise then do not have to be taken into account in the frame rim model.

In a fourth variant of the fourth aspect of the invention, optionally also in other aspects of the invention, the transforming comprises an approximation of the data sets by parametric curves. Parametric curves are curves described by parameters. One example of such parametric curves is the splines already mentioned. In embodiments of this type, these curves are fitted to each of the data sets, for example once again by means of the method of least squares, such that ultimately each data set is then characterized by the respective parameters, for example spline coefficients. This results firstly in smoothing, since as it were smooth curves are placed through the points defined by the data sets.

In this way, the data sets are reduced to a representation having fewer degrees of freedom (now only the parameter values), which can simplify a computational complexity during subsequent processing for providing the parametric frame rim model. Such fitting of parametric curves is a further example of a reparameterization.

One example of such subsequent processing is an image analysis. For such an image analysis, according to the invention, a method is provided, comprising:

providing at least one image of at least one part of a head with a spectacle frame, providing a parametric frame rim model which was created by one of the methods discussed above, and analyzing the at least one image using the parametric frame rim model.

The analysis of the image should be understood to mean processing of the image, which processing contributes ultimately to obtaining information from the at least one image.

One example of such information is the detection of the frame rim in one or more images, which are preferably recorded from different directions. This detection is also called segmentation. Segmentation is understood generally to mean identifying specific image constituents. It is facilitated to a considerable extent if a frame rim model is present whose parameters have to be fitted, since only specific expedient profiles of the curve are representable at all in the image. Without such a model it is difficult to find a curve which satisfies the characteristic properties of one spectacle lens edge or two spectacle lens edges; e.g., the symmetry of the two lenses detected in the image is given naturally in a 3D frame model. In contrast thereto, it is difficult to attain the symmetry of the two spectacle lenses in an image segmentation method, since perspective distortions during the imaging of the 3D frame rim into the image result in asymmetrical 2D contours. As a result of the detection of the frame rim, it is then possible to determine centering parameters, as explained in the introduction with reference to DE 10 2011 115 239 B4.

A further example of information is therefore also the specific determination of the parameters of the parametric frame rim model, which parameters can be obtained by detecting the frame rim in one or more images and fitting the frame rim model to the detected frame rim. In the case where a plurality of images are used, they are preferably recorded from a plurality of directions, which increases the accuracy of the detection of the frame rim. From these parameters, it is also possible to calculate further parameters describing a translation, rotation, scaling, etc., of the frame rim model for fitting to the image. If the specific parameters of the frame rim model are known, the position of the frame in space is determined.

According to the definition—explained in the introduction—of the frame rim including for frameless spectacles and spectacles having partial frames, with the position of the frame rim, a representation of an edge of a corresponding spectacle lens to be inserted into the frame is also known and can thus be determined. Consequently, it is also possible to determine such a representation of an edge of a spectacle lens as explained above for the detection of the frame rim.

The representation of the edge of a spectacle lens is understood by the invention to mean a representation of the bearing edge of the spectacle lens presented in the standard EN ISO 13666:2012 (D/E), section 13.1.

A representation of the edge of a spectacle lens is a data set from which the three-dimensional course of the bearing edge of the spectacle lens facing away from the spectacle wearer can be determined unequivocally as appropriate on the basis of additional variables describing the spectacle lens. A representation of the edge of a spectacle lens can, for example, be the area surrounded by the projection of the edge of the spectacle lens in the image plane of an image sensor of an image recording device, into which area the spectacle lens is projected for the image capture.

In the case of fully rimmed spectacles, the bearing edge of a spectacle lens corresponds to a spectacle frame inner rim. In the case of partially rimmed spectacles, the bearing edge of a spectacle lens is understood on the one hand to mean the edge of a spectacle lens corresponding to the spectacle frame inner rim and the lens outer edge not connected to the spectacle lens frame. The bearing edge of a spectacle lens in the case of rimless spectacles is the lens outer edge.

The frame-specific centering parameters, e.g., the forward inclination or the frame lens angle, can then be determined therefrom. If the position of the eyes in space is additionally known as well, the centering parameters can be fully determined.

Accordingly, a method for centering a spectacle lens in a spectacle frame is also provided, characterized in that a step (i) involves determining centering parameters with respect to the spectacle lens, wherein determining the centering parameters comprises ascertaining the representation of the edge of the spectacle lens by means of the method as described above, and a step (ii) involves centering the spectacle lens in the spectacle frame using the centering parameters determined in step (i).

Furthermore, a method is provided for fitting a spectacle lens into a spectacle frame by grinding, characterized in that, a step (i) involves determining centering parameters with respect to the spectacle lens, wherein determining the centering parameters comprises ascertaining the representation of the edge of the spectacle lens by means of the method as described above, and a step (ii) involves fitting the spectacle lens by grinding for an arrangement in the spectacle frame on the basis of the centering parameters determined in step (i).

Finally, a method for producing a spectacle lens is also characterized by the method step of fitting the spectacle lens by grinding as described above.

In this regard, by means of the frame rim models according to the invention, centering, fitting by grinding and producing a spectacle lens can be carried out without the optician's workflow having to be changed as in DE 10 2011 115 239 B4 cited in the introduction.

After the detection of the frame rim in the image by means of the frame rim model, it is also possible to determine properties of spectacles from the image as information, e.g., color, shape or size of the spectacles.

If the specific parameters of the 3D frame model are known or have been previously estimated, as information it is also possible to obtain camera parameters from the identification of the frame rim in one or more images, e.g., the extrinsic parameters (a position) of a calibrated camera used or the intrinsic and extrinsic camera parameters of an uncalibrated camera jointly. This may be helpful particularly in applications in which mobile apparatuses, such as smartphones or tablets, the position of which in space is not fixed, are used for image recording. Alternatively, both the parameters of the 3D model and the camera parameters can also be determined simultaneously, e.g., by solving an optimization problem.

In this case, the camera parameters of a camera are understood to mean extrinsic parameters, i.e., parameters which do not result from the properties of the camera itself, such as the relative orientation in space, i.e., the relative orientation of the optical axis of the camera with respect to other objects, and also the intrinsic parameters of the camera, that is to say the properties of the camera itself. One example of such intrinsic parameters is parameters which define how the coordinates of a point in space in a coordinate system referenced with respect to the camera are converted into the coordinates of the pixel of this point that lies in the image plane of the image sensor. A detailed description of the calibration of cameras involving the determination of camera parameters of this type is found e.g., on page 8 in the textbook "Multiple View Geometry in Computer Vision" by Richard Hartley and Andrew Zisserman, 2nd edition, Cambridge University Press 2004.

Information obtained can also be used for altering or enhancing the image. In this regard, after determining the parameters of the frame rim model, it is possible to remove artefacts from the image, e.g., a shadow cast on the head by the spectacles in the image, by projection of the frame rim onto the head depending on the position of a given light source and subsequent inpainting (repairing the texture) in this region. It is likewise possible to remove the frame from the images by the frame model being projected into the images in accordance with the camera imaging properties and the contour ensuing therefrom being removed from the images and this being repaired by means of inpainting.

The use of the parametric frame rim model during the analysis enables the analysis to be simplified, examples of this being discussed below.

Providing the at least one image can comprise for example recording one or more images by means of one or more cameras arranged in a fixed geometry. In the case of a plurality of cameras with a fixed geometry or a single camera, which carries out a predefined (and thus known) or else arbitrary movement relative to the head, in order to record the head from different directions, this makes it possible in particular to triangulate the head, i.e., to determine a three-dimensional contour of the head. Image recording of this type is also described for example in DE 10 2011 115 239 B4 mentioned in the introduction.

There are various possibilities for the image analysis using the parametric frame model. In this regard, the parametric frame model can be used to facilitate segmentation of the at least one image, in particular identification of the frame rim in the at least one image.

It should be noted that two main problems occur during the segmentation of the frame rim. Firstly, frame edges may be poorly identifiable or not identifiable at all (e.g., in the case of rimless spectacle frames or in the case of spectacle frames having colors similar to the color of skin. This can have the effect that edges are identified only incompletely. Secondly, edges present in the image may be identified incorrectly as frame edges (e.g., if the hair or the background can be seen through the outer rim of the spectacles, this gives rise to strong edges with respect to the color of the skin of the face, which are easily confused with the frame edge). In order to correctly infer incomplete edges and/or in order to rule out incorrect edges, it is possible to use the parametric frame model since the parametric frame wheel model does not permit any atypical frame rim courses (e.g., truncated lenses, nonsymmetrical lenses, lens edges having a bulge or an indentation, that is to say having a high curvature, etc.).

In the event of such segmentation, in one embodiment, in the case of a 2D frame rim model, the space of the possible solutions for the frame rim to be identified in the image can be restricted to the possibilities predefined by the parametric frame model, that is to say that from the outset only frame rims which are describable by the parametric frame model are sought in the image. In the case of a 3D frame rim model, in one embodiment, camera calibration data are used. The camera calibration data describe a mapping specification of (three-dimensional) points in space onto an image recorded by a camera used for recording the at least one image. With the aid of the camera calibration data, the parametric frame rim model can be projected into the image and be used for identifying edges of the frame rim. In this case, a projection is understood to mean a mapping of a 3D model into a 2D image. If no calibration data are present, in some embodiments, the frame rim model can be projected into the at least one image, e.g., by the abovementioned mapping specification being concomitantly optimized or estimated in a first step.

The at least one image can also comprise a plurality of images recorded from different directions, e.g., as stereo image recording. By means of triangulation, a 3D image can be calculated therefrom in accordance with computation steps known from the stereo image recording, in which 3D image the 3D frame rim model can then be used for identifying the frame rim. By identifying the frame rim in the image, the parameters of the parametric frame rim model are then also known for this frame rim, e.g., if segmenting and determining the parameters are carried out in a common optimization method. The parametric frame rim model with the parameters thus determined can then be used e.g., for determining centering parameters, as will be briefly explained further below.

If, as explained above, probability distributions for the parameters of the parametric frame rim model are present, they can likewise be used, for example by a mean value of the parameter initially being taken as a basis in the image analysis. This value can then be sequentially improved, e.g., within an MCMC method, which involves randomly choosing a respective parameter set in accordance with the distributions of the individual parameters and then calculating the distance between the frame edges projected into the image with the edges detected in the image e.g., by means of an edge detector. This method is repeated very often and thereby leads to a distribution over parameters with associated distances. At the end the parameter set having the smallest distance value can then be chosen as the best.

Alternatively, it is possible to use the mean value of the parameter as an initial value in an optimization problem, e.g., within a gradient descent method.

In order to improve the identification of the frame rim, in another embodiment, a deviation of a frame rim ascertained from the at least one image from the parametric frame rim model can also be included, for example in the form of a penalty term in a cost function for determining the frame rim in the at least one image. The penalty term then becomes all the greater, the further away from the parametric frame rim model an instantaneously identified frame rim is. This therefore constitutes an addition in existing optimization methods, for example in an MCMC method or gradient descent method, graph cut method, Markov Random Field optimization method and the like. Optimization methods of this type are described for example in Christopher Bishop, "Pattern Recognition and Machine Learning", Springer Verlag 2006, ISBN-10: 0-387-31073-8.

For this purpose, in one embodiment, possible frame rims are described mathematically, e.g., as a sequence of points or else as a binary function describing a spectacle lens to be inserted into the spectacle frame on the image with an argument of the function e.g., between 0 (outside the spectacle lens) and 1 (within the spectacle lens). In this case, the set of possible frame rims constitutes a family of frame rim functions. In order then to identify the frame rim or the shape thereof in the at least one image, a cost function is defined, which e.g., uses the edges in the image or the colors in the image and assigns a value to each possible frame rim. The minimum of this cost function (minimization is effected over the family of frame rim functions—the cost function is thus a function of functions or frame rims) is then the best frame rim function matching the assumptions (edges and color, etc.) in the cost function. In addition to the other terms in the cost function (edge, color, symmetry, etc.), a penalty term can then be added to the cost function, the penalty term containing the deviation of the frame rim to be identified in the at least one image (in the mathematical representation) from all possible contours that can be described by the parametric frame rim model. In this case, a penalty term is generally an additional term in the cost function which increases the "costs", i.e., the value of the function, depending on specific circumstances, in this case depending on a deviation of the frame rim from the parametric frame rim model. That is to say that solutions for the frame rim to be identified which are far away from the space of the frame rims describable by the parametric frame rim model have high costs in an optimization of the frame rim to be identified (i.e., in an optimization that serves to identify a frame rim as well as possible in the at least one image, such that the identified frame rim corresponds as accurately as possible to the frame rim actually present). This penalty term can be added to all possible cost functions which optimize the frame rim to be identified in the at least one image.

In another possibility for analysis, the frame rim is identified in the image by means of conventional methods, for example by the methods mentioned in the introductory part of the description of DE 10 2011 115 239 B4. The parametric frame rim model is then fitted to this identified frame rim, i.e., the parameters of the parametric frame rim model are optimized in order to attain the greatest possible correspondence between the parametric frame rim model and the frame rim identified in the at least one image. This fitting can be carried out according to the method of least squares or some other conventional optimization method. In the case of this application, the determination of the parameters of the parametric frame rim model is simpler than in the case in which the parametric frame rim model is used for segmentation as described above, since only the parameters have to be found and the frame rim has already been identified in the image.

After determination of the parameters, the parametric frame rim model can then be used for further evaluations. By way of example, in addition, a position of the eyes can be determined from the at least one image or by means of a distance measurement with respect to the camera, and the centering parameters mentioned in the introduction can then be determined from the position of the eyes and the parametric frame rim model. Since the centering parameters are simple geometric variables, they then result simply from the geometric description of the frame rim, which description is given by the parametric frame rim model, and the position of the eyes with respect thereto. Some centering parameters, such as e.g., dimensions of a rectangle formed by the horizontal and vertical tangents to the outermost edges of the spectacle lens (boxing system according to 5.1 DIN EN ISO 13666:2012), can also be determined without the position of the eyes just from the parametric frame rim model, since they depend only on the dimensions and the shape of the frame rim.

In the case where the parametric frame rim model comprises the multiplicity of data sets or further data sets derived from the multiplicity of data sets, the fitting of the parametric frame rim model to a frame rim identified in an image can also consist in identifying the best matching data set from the multiplicity of data sets or further data sets. For this purpose, by way of example, for all data sets of the multiplicity of data sets or the multiplicity of further data sets, the deviations from the identified frame rim are calculated and the data set having the smallest deviations is selected. The number of this data set then constitutes the parameter determined.

The methods mentioned above are typically carried out in a computer-implemented manner. Accordingly, a further aspect of the present invention provides a computer program comprising a program code which, when executed on one or more processors of a computing device, carries out one of the methods described above.

Finally, a corresponding computing device comprising a processor and a memory, in which a corresponding computer program is stored, is also provided. In this case, the memory can be, in particular, a physically tangible memory. In this case, the computing device additionally comprises a data input for receiving the data sets. In this case, the data input can be a network connection in order to receive the data sets via a network such as the Internet, or be a receptacle for a storage medium in order to receive the data sets stored on the storage medium, for example a USB interface for receiving a memory stick or an optical drive (DVD or CD drive) for receiving an optical storage medium.

BRIEF DESCRIPTION OF THE DRAWINGS

For further explanation, the invention is explained in greater detail below on the basis of exemplary embodiments with reference to the accompanying drawings. In the drawings.

DESCRIPTION OF EXEMPLARY EMBODIMENTS

Figure 1:
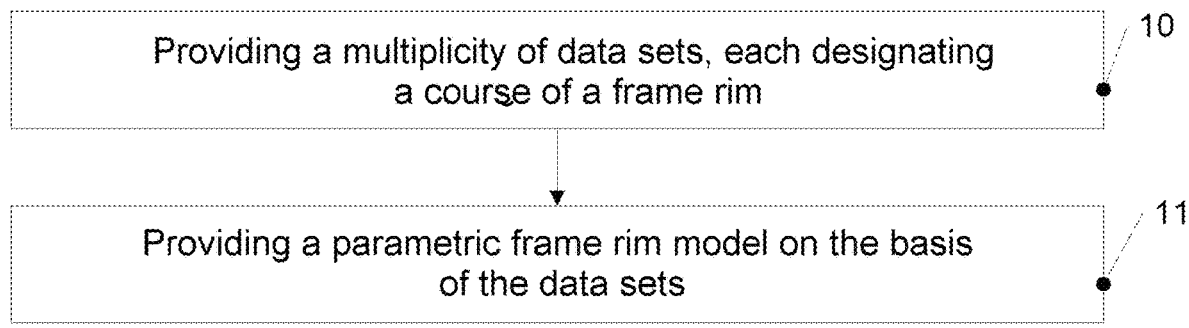
FIG. 1 shows a flowchart of a method in accordance with one exemplary embodiment.

FIG. 1 shows a flowchart that generally shows the sequence of a method in accordance with one exemplary embodiment. In a step 10, the method comprises providing a multiplicity of data sets, each identifying a course of a frame rim of a spectacle frame. As already explained, the data sets can comprise tracer data or CAD data. In a step 11, the method then comprises providing a parametric frame rim model on the basis of the data sets provided in step 10, wherein the possibilities already explained can be used for the providing.

Figure 2:
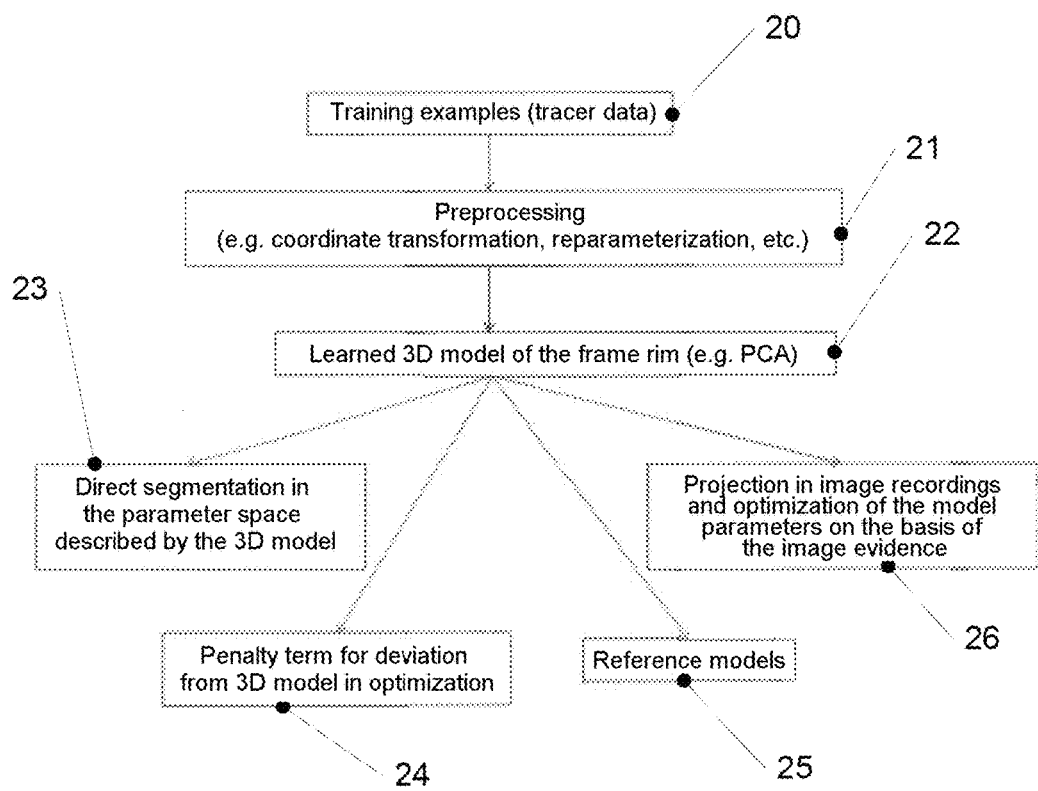
FIG. 2 shows a flowchart of a method in accordance with a further exemplary embodiment.

FIG. 2 shows a more detailed flowchart of a method in accordance with one exemplary embodiment. In the exemplary embodiment in FIG. 2, a step 20 involves providing data sets, for example tracer data, as training examples. A step 21 involves carrying out preprocessing, i.e., transforming the data sets into a different format, for example by means of coordinate transformation or reparameterization as already described.

In step 22, on the basis of the preprocessed data sets, a parametric frame rim model, in this case a 3D model, is then generated, for example by principal component analysis. As indicated by steps 23 to 26, this model can then be used in various ways. Step 23 involves carrying out, for example, a segmentation of one or more recorded images of at least one part of a head (in particular the eye part) wearing a spectacle frame, using the 3D model. Here, therefore, as described above, the parametric frame rim model is used to simplify identification of a frame rim in recorded images.

In step 24, as described, in an optimization process for identifying a frame rim in one or more images, a penalty term is created on the basis of a deviation of an instantaneously identified frame rim from the parametric frame rim model. In step 25, as likewise already explained, the data sets or the preprocessed data sets can serve as it were as a library. In step 26, firstly a frame rim is identified in one or more images, and the parameters of the parametric frame rim model are then fitted to the identified frame rim. Steps 23 to 26 can then ultimately serve for determining centering parameters, as described.

Figure 3:
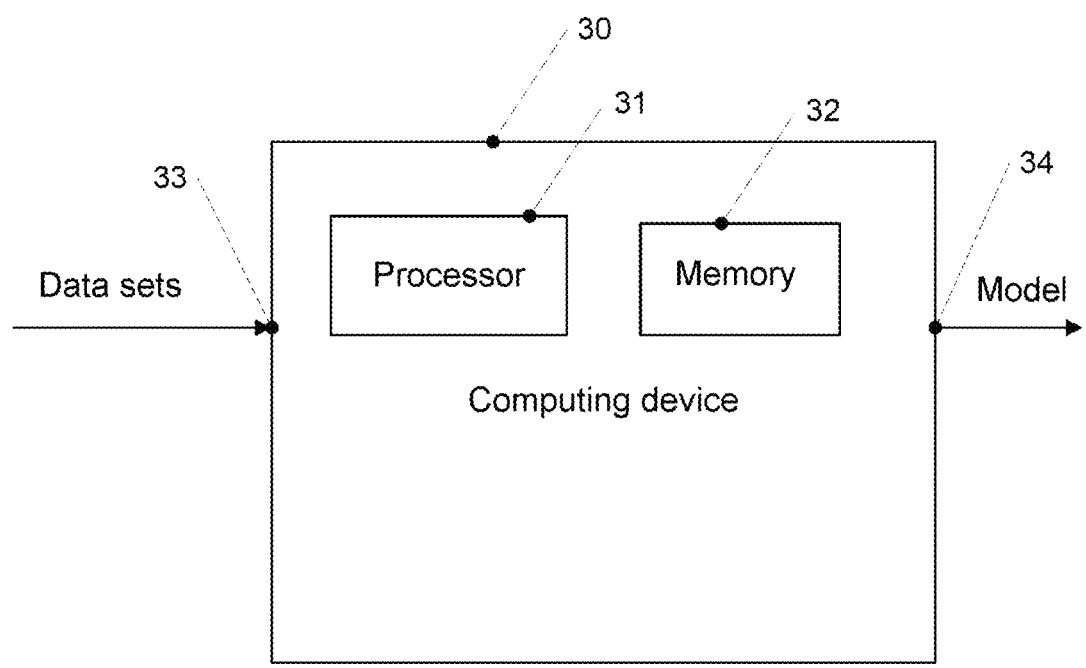
FIG. 3 shows a block diagram of a computing device in accordance with one exemplary embodiment.

FIG. 3 shows a block diagram of a computing device 30 in accordance with one exemplary embodiment. The computing device 30 comprises a processor 31 and a memory 32, for example a random access memory (RAM) or a read only memory (ROM), in which a program code is stored. When the program code stored in the memory 32 runs on the processor 31, one or more of the methods described above are carried out, in particular the method from FIG. 1 or FIG. 2. For this purpose, corresponding data sets such as the tracer data or CAD data described are fed to the computing device 30 via a data input 33. A corresponding parametric frame rim model, which was determined as described, is then output at a data output 34. It should be noted that data input 33 and data output 34 can also be physically identical, for example can be formed by a network interface or the like. As a computing device 30 of this type it is possible to use a commercially available computer, for example, which is then programmed accordingly.

Figure 4:
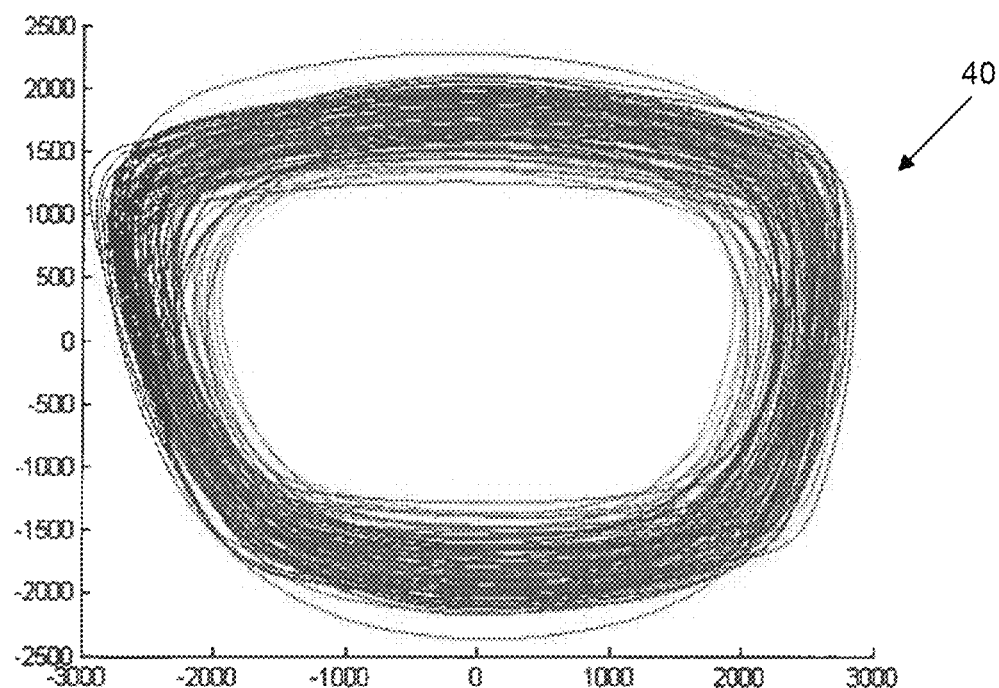
FIG. 4 shows a diagram for elucidating a data set.

FIG. 4 shows, in a 2D representation, a multiplicity of data sets 40 for elucidating the concepts explained above. In FIG. 4, each data set corresponds to a closed line designating the section of a frame rim for a spectacle glass. From this multiplicity of lines representing for example tracer data from measurements of different spectacle frames, it is then possible to create a parametric frame rim model as described.

Figure 5:
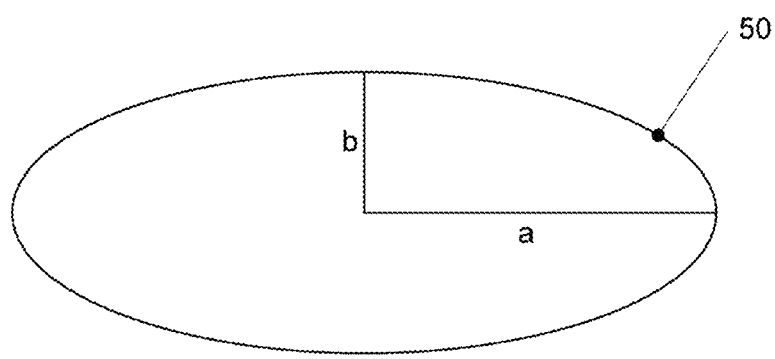
FIG. 5 shows an illustration for elucidating a parametric model.

FIG. 5 shows a simple diagram for elucidating a parametric frame rim model. In the example in FIG. 5, an ellipse 50 serves as the model, and the semi-major axis a and the semi-minor axis b of the ellipse 50 serve as parameters. In one of the variants already described, the ellipse 50 can serve for example as the predefined parametric frame rim model 50. The ellipse 50 can then be fitted to each data set, for example to each of the curves of the data set 40 in FIG. 4, in order thus to obtain a value for the semi-major axis a and a value for the semi-minor axis b for each data set. From the values thus ascertained, it is then possible to create a probability distribution for the parameters a and b, for example in the form of a histogram or in the form of mean value and standard deviation. It should be noted that the ellipse 50 in this case was chosen merely as a simple example, and more complex geometric shapes are also possible. It should generally be noted that the exemplary embodiments illustrated and described serve only for elucidation and should not be interpreted as restrictive.

Some exemplary embodiments are defined by the following clauses:

Clause 1. A method for providing a frame rim model, comprising:
  i) providing a multiplicity of data sets, each describing a course of a frame rim of a respective spectacle frame, and
  ii) providing a parametric frame rim model on the basis of the multiplicity of data sets.

Clause 2. The method according to clause 1, wherein providing the parametric frame rim model comprises calculating the parametric frame rim model from the multiplicity of data sets.

Clause 3. The method according to clause 2, wherein the calculating comprises machine learning on the multiplicity of data sets.

Clause 4. The method according to clause 2 or 3, wherein the calculating comprises a principal component analysis and/or an independent component analysis of the multiplicity of data sets.

Clause 5. The method according to any of clauses 1-4, wherein providing the parametric frame rim model comprises calculating probability distributions for parameters of a predefined frame rim model on the basis of the multiplicity of data sets.

Clause 6. The method according to any of clauses 1-5, wherein providing the parametric frame rim model comprises providing the multiplicity of data sets or a multiplicity of further data sets derived from the multiplicity of data sets, wherein a parameter of the parametric frame rim model indicates a data set of the multiplicity of data sets or of the multiplicity of further data sets.

Clause 7. The method according to any of clauses 1-6, wherein providing the parametric frame rim model comprises transforming the multiplicity of data sets.

Clause 8. The method according to clause 7, wherein the transforming comprises a coordinate transformation and/or a sampling of curves defined by the data sets at identical angular distances and/or a filtering of the data sets and/or an approximation of the data sets by parametric curves.

Clause 9. The method according to clause 8, wherein the coordinate transformation comprises a transformation to mutually corresponding reference points of a frame rim described by the respective data set and/or an identical orientation of the data sets.

Clause 10. A method for image analysis, comprising:
i) providing at least one image of at least one part of a head with a spectacle frame,
ii) providing a parametric frame rim model which was created by the method of any of clauses 1-9, and
iii) analyzing the at least one image using the parametric frame rim model.

Clause 11. The method according to clause 10, wherein analyzing the image comprises identifying a frame rim in the at least one image with the aid of the parametric frame rim model.

Clause 12. The method according to clause 11, wherein identifying the frame rim comprises an optimization process with a penalty term depending on a deviation of a frame rim to be optimized from the parametric frame rim model and/or comprises identifying the frame rim on the basis of probability distributions of parameters of the parametric frame rim model.

Clause 13. The method according to clause 10, wherein the analyzing comprises identifying a frame rim in the at least one image and fitting parameters of the parametric frame rim model on the basis of the identified frame rim.

Clause 14. A computer program comprising a program code which, when executed on a processor, carries out the method according to any of clauses 1-13.

Clause 15. A computing device, comprising:
i) a processor,
ii) a data input for receiving a multiplicity of data sets, each describing a course of a frame rim of a respective spectacle frame, and
iii) a memory, wherein the computer program according to clause 14 is stored in the memory.

The invention claimed is:

1. A computer-implemented method for image analysis, the method comprising:
providing at least one image of at least one part of a head of a user wearing a spectacle frame;
providing a multiplicity of data sets, each multiplicity of data sets describing a course of a frame rim of a respective spectacle frame;
creating a parametric frame rim model on a basis of the multiplicity of data sets;
analyzing the at least one image with the parametric frame rim model, wherein the analyzing includes identifying a frame rim in the at least one image and fitting parameters of the parametric frame rim model on a basis of the identified frame rim; and
determining centering parameters on a basis of the identified frame rim and of the parameters of the parametric frame rim model,
wherein providing the parametric frame rim model includes at least one of:
predefining the frame rim model followed by calculating probability distributions for the fitting parameters of the predefined parametric frame rim model on the basis of the multiplicity of data sets; or
carrying out the fitting of the fitting parameters of the parametric frame rim model with probability distributions for the fitting parameters of the parametric frame rim model.

2. The method as claimed in claim 1, wherein providing the parametric frame rim model comprises calculating the parametric frame rim model from the multiplicity of data sets.

3. The method as claimed in claim 2, wherein the calculating comprises machine learning on the multiplicity of data sets.

4. The method as claimed in claim 2, wherein the calculating comprises performing at least one of a principal component analysis or an independent component analysis of the multiplicity of data sets.

5. The method as claimed in claim 1, wherein providing the parametric frame rim model comprises providing the multiplicity of data sets or a multiplicity of further data sets derived from the multiplicity of data sets, wherein a parameter of the parametric frame rim model indicates a data set of the multiplicity of data sets or of the multiplicity of further data sets.

6. The method as claimed in claim 1, wherein providing the parametric frame rim model comprises transforming the multiplicity of data sets.

7. The method as claimed in claim 6, wherein the transforming comprises at least one of:
a coordinate transformation;
a sampling of curves defined by the data sets at identical angular distances;
a filtering of the data sets; or
an approximation of the data sets by parametric curves.

8. The method as claimed in claim 7, wherein the coordinate transformation comprises a transformation to mutually corresponding reference points of a frame rim described by the respective data set and/or an identical orientation of the data sets.

9. The method as claimed in claim 1, wherein identifying the frame rim comprises an optimization process with a penalty term depending on a deviation of a frame rim to be optimized from the parametric frame rim model.

10. A non-transitory memory storing a computer program comprising program code which, when executed on a processor, carries out the method as claimed in claim 1.

11. A computing device, comprising:
a processor;
a data input for receiving a multiplicity of data sets, each describing a course of a frame rim of a respective spectacle frame; and
a non-transitory memory, wherein the computer program as claimed in claim 10 is stored in the non-transitory memory.

* * * * *